United States Patent [19]

Takai et al.

[11] Patent Number: 5,019,924
[45] Date of Patent: May 28, 1991

[54] TAPE REEL ROTATION DETECTING APPARATUS

[75] Inventors: Kazuki Takai; Eiji Ishikura, both of Tokyo, Japan

[73] Assignee: Clarion Co., Ltd., Tokyo, Japan

[21] Appl. No.: 396,906

[22] Filed: Aug. 22, 1989

[30] Foreign Application Priority Data

Aug. 29, 1988 [JP] Japan .................................. 63-212526

[51] Int. Cl.⁵ ........................ G11B 15/52; G11B 15/48
[52] U.S. Cl. ................................. 360/73.14; 360/74.2
[58] Field of Search .................... 360/137, 72.3, 73.14, 360/74.2

[56] References Cited

U.S. PATENT DOCUMENTS

| | | | |
|---|---|---|---|
| 4,163,532 | 8/1979 | Sakai | 360/73.14 |
| 4,370,684 | 1/1983 | Kanayama et al. | 360/72.3 |
| 4,553,182 | 11/1985 | Narita | 360/69 |
| 4,873,590 | 10/1989 | Ishiwata et al. | 360/73.14 |

Primary Examiner—A. J. Heinz
Assistant Examiner—Jefferson Evans
Attorney, Agent, or Firm—Flynn, Thiel, Boutell & Tanis

[57] ABSTRACT

A tape reel rotation detecting device is configured to detect abnormal rotations of a reel by comparing the length of a pulse generated in response to rotations of the reel and a pulse length set to correspond to abnormal rotations of the reel.

9 Claims, 4 Drawing Sheets

TAPE REEL ROTATION DETECTING APPARATUS

FIELD OF THE INVENTION

This invention relates to an apparatus for detecting rotation of a tape reel in a tape recorder, etc.

BACKGROUND OF THE INVENTION

In a tape recorder, etc., it is required that a tape reel rotates at desired, predetermined rotation speeds to wind up a tape from a capstan without tape slack. However, irregular rotations of the reel sometimes occur because of various reasons.

Since the winding diameter of a tape reel is changed as a tape is progressively wound thereon, the length of the tape wound on the tape reel in one rotation thereof largely varies between a condition with no tape wound thereon and a condition with substially all length of the tape wound thereon. Therefore, a mechanism called friction arrangement is attached to a reel shaft in most cases, so that the friction arrangement slips under controls by the load applied to the reel in order to absorb the difference between different winding diameters and maintain a constant winding length per time.

In a cassette tape, etc., however, undulations are often produced on accumulated turns of a wound tape, and a hill portion of the undulations contacts the cassette half. This causes a so-called tight winding and increases the load. The increased load invites slipping motions of the friction mechanism which slows down the rotation and tape winding speed of the tape reel. When such tight winding occurs, a play run is difficult. That is, program changing operations are repeated, and this is dealt with as an abnormal inversion. Under such conditions, tape slack is produced in the tape subsequently supplied from the capstan, and this often invites such a trouble, among others, that the tape gets entangled on the capstan or the pinch roller.

Beside this, a conventional tape recorder, etc. is configured to merely detect a stationary condition of the tape reel to perform a channel changing or ejecting operation when the reel rotation is stopped upon arrival at a tape end. Therefore, it is impossible for the conventional tape recorder to early detect and cure the said abnormal rotation.

OBJECT OF THE INVENTION

It is therefore an object of the invention to provide an apparatus capable of detecting abnormal rotations of a reel and outputting a signal indicative of the abnormal rotations.

SUMMARY OF THE INVENTION

In order to achieve the object, an inventive tape reel rotation detecting apparatus comprises: pulse generating means responsive to rotations of a reel to generate a pulse; pulse length setting means for setting a pulse length corresponding to abnormal rotations of the reel; and means for comparing the pulse length of a pulse from said pulse generating means with the pulse length set in said pulse length setting means to detect abnormal rotations of the reel and produce a troubleindicative signal.

The pulse generating means produces a pulse responsive to the number of revolution of the reel. In the pulse length setting means is originally set a predetermined pulse length corresponding to abnormal rotations of the reel. For example, pulse lengths corresponding to the minimum and maximum numbers of revolution may be set originally. Thus by comparing the preset pulse lengths with a pulse length of an actual pulse obtained from the pulse generating means, an abnormal rotation of the reel is detected. When any abnormal rotation is recognized, a trouble-indicative signal is outputted.

DETAILED DESCRIPTION

The invention is described below in detail, referring to preferred embodiments.

Figure 1:
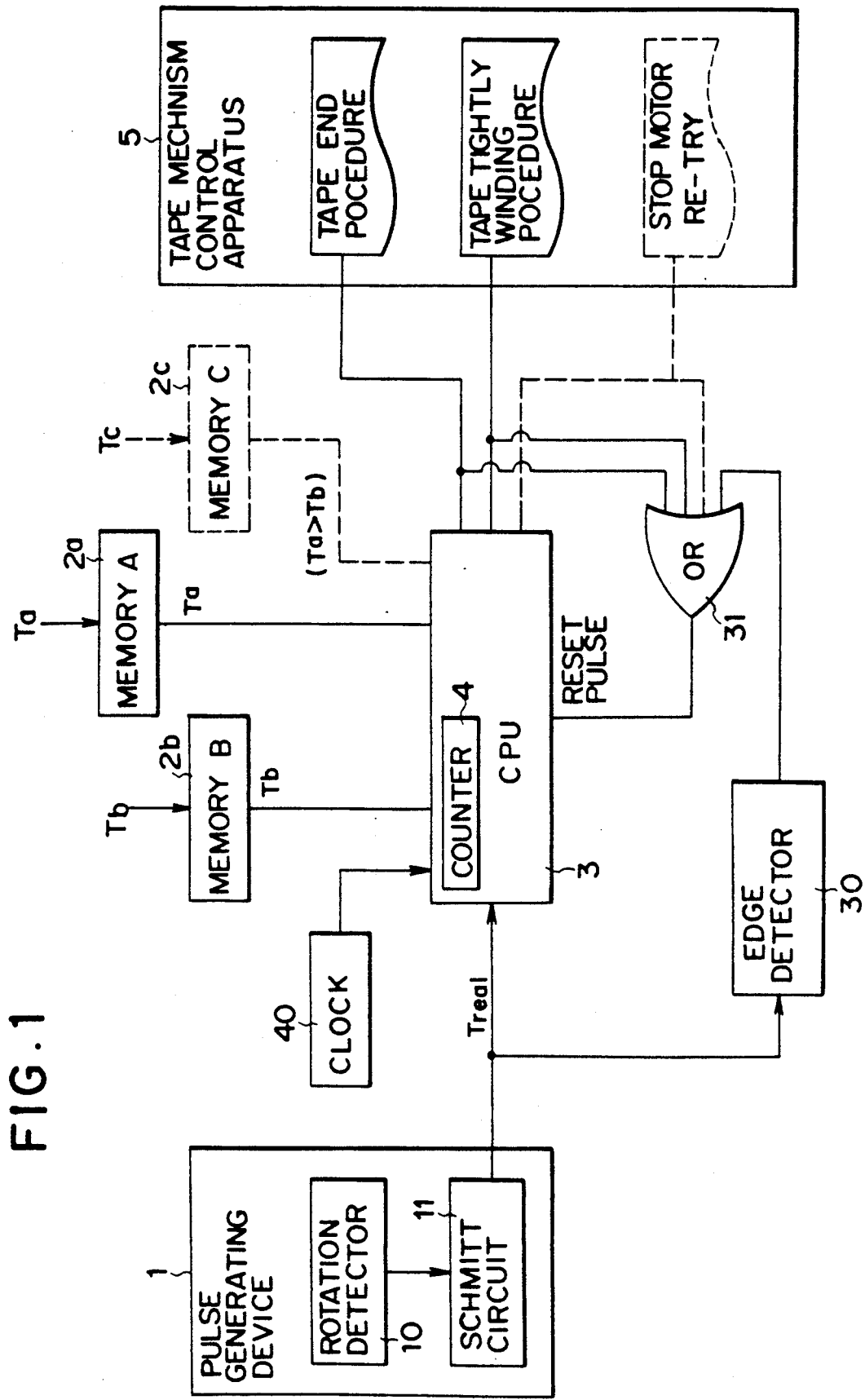
FIG. 1 is a block diagram of an embodiment of the invention.
Figure 2:
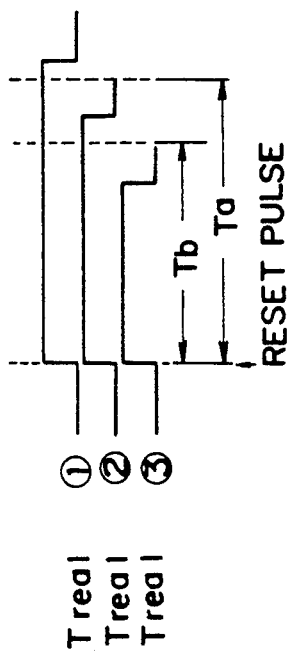
FIG. 2 is a view for explaining preset pulse lengths.

FIG. 1 is a block diagram of an inventive apparatus which consists of a pulse generating device 1, pulse length setting memory 2 and abnormal rotation detecting device 3. The pulse generating device 1 consists of a rotation detector 10 and a Schmitt circuit 11. The rotation detector 10 produces a predetermined number of pulses per every predetermined rotations of a take-up reel. The rotation detector 10 may be an optical, magnetic or other rotation sensor. The Schmitt circuit 11 shapes the waveform of pulses from the rotation detector 10, and transmits them to the abnormal rotation detecting device 3. The abnormal rotation detecting device 3 majorly consists of a microcomputer CPU, etc., and forms therein a comparator for comparing pulse lengths and a pulse length counter 4 for counting clocks from a clock 40, both in the form of software. The pulse length setting memory 2 is used to store a predetermined pulse length, and such a pulse length is entered through an operating device. In this embodiment, a pulse length setting memory 2a stores a tape end detection setting value Ta, and a pulse length setting memory 2b stores a low-speed pulse length setting value Tb. The values Ta and Tb has a relationship of Ta > Tb as shown in FIG. 2. When the length Treal of an actual pulse entering from the pulse generating device 1 is in the range of Ta > Treal > Tb, it is judged to be an abnormal low speed. When it is in the range of Treal > Ta, it is judged to be a tape end. Further, when it is in the range of Tb > Treal, the device 3 judges the reel rotation to be a normal rotation. A length setting memory 2c is used for detecting a high-speed rotation as is described later in a greater detail.

The pulse length counter 4 provided in the abnormal rotation detecting device 3 measures the pulse length Treal of a pulse entering from the pulse generating device 1. The device 3 subsequently compares the pulse length Treal with the pulse length stored in the pulse length setting memory 2, and performs the judgment shown in FIG. 2. A result of the judgment is outputted to a tape mechanism control apparatus 5.

The tape mechanism control apparatus 5 is responsive to the result of the judgment from the abnormal rotation detecting device 3 to perform a tape end processing or a tight winding processing. The tight winding procedure includes stopping the tape, indicating this condition, rewinding the tape, etc. Motor stopping processing (re-try) is done in case of abnormal highspeed rotations as is described later.

An OR circuit 31 is used for resetting the abnormal rotation detecting device 3 and is activated to reset same in response to a downhill detection output from an edge detector 30 and a signal output from the device 3 to the tape mechanism control apparatus 5.

Figure 3:
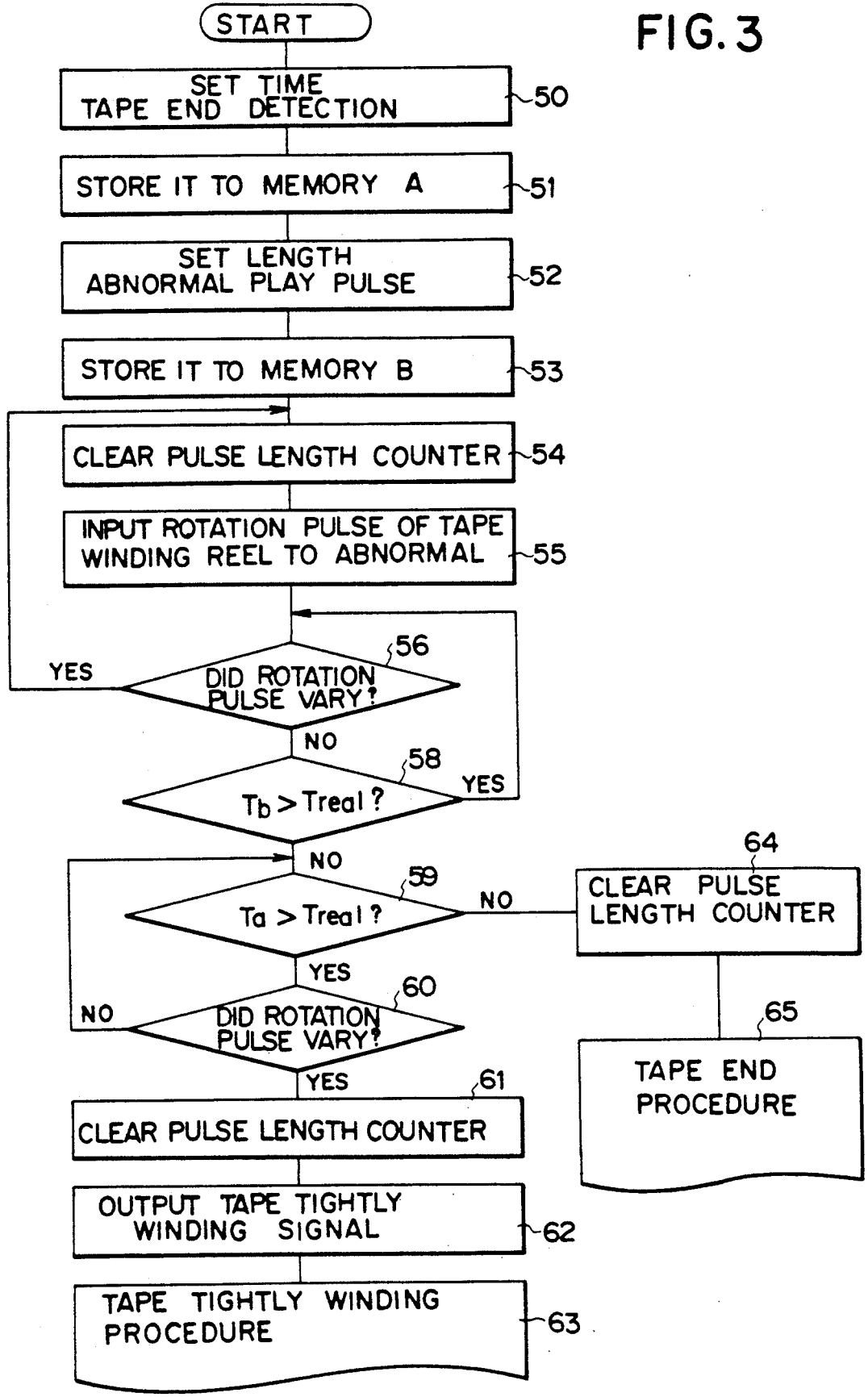
FIG. 3 is a flow chart for explaining the operation process of the apparatus.

The operation of the device is explained below, referring to FIG. 3.

First of all, the tape end detecting time Ta is set (step 50) and it is stored in the pulse length setting memory 2 (step 51). Additionally, the abnormal pulse length Tb is set (step 52) and it is stored in the pulse length setting memory 2b (step 53). Subsequently, the pulse length counter 4 is cleared (step 54), a rotation pulse of the take-up reel from the pulse generating device 1 is entered in the abnormal rotation detecting device 3 while the pulse length counter begins its counting and continues it until it is cleared (step 55). The abnormal rotation detecting device 3 checks whether any change is present or not in the pulse (step 56). If any change is present at that time, the device judges the reel rotation to be normal, and the process is returned to step 54 and a subsequent pulse is entered. When no change is found, the pulse lengths Treal and Tb at that time are compared (step 58). When Tb >Treal, the reel rotation is normal at the time, and the process is therefore returned to step 56. Here the abnormal rotation detecting device 3 checks whether any change is present or not in the pulse, and the counting is progressed. When Treal >Tb is established, the abnormal rotation detecting device 3 compares Ta with Treal (step 59). As long as Ta >Treal is maintained, the device 3 checkes whether any change occurs in the pulse in this period (step 60), and if so, deems the condition tq be an abnormal low speed and a tape tight-winding. Then the device 3 clears the pulse length counter 4 (step 61), subsequently produces a tape tight-winding signal (step 62), and causes the tape mechanism control apparatus 5 to perform its processing (step 63). When no change is found in the pulse in step 60, the process is returned to step 59. Throughout this time, the pulse length counter 4 continues its counting operation, and when Treal >Ta is established, the device 3 recognizes arrival at a tape end. Then the device 3 clears the pulse length counter 4 (step 64), subsequently applies a signal indicative of this condition to the tape mechanism control apparatus 5, and causes it to perform its tape end processing (step 65).

After the aforegoing operations, detection of an abnormal low speed and a tape tight-winding is enabled.

Figure 4:
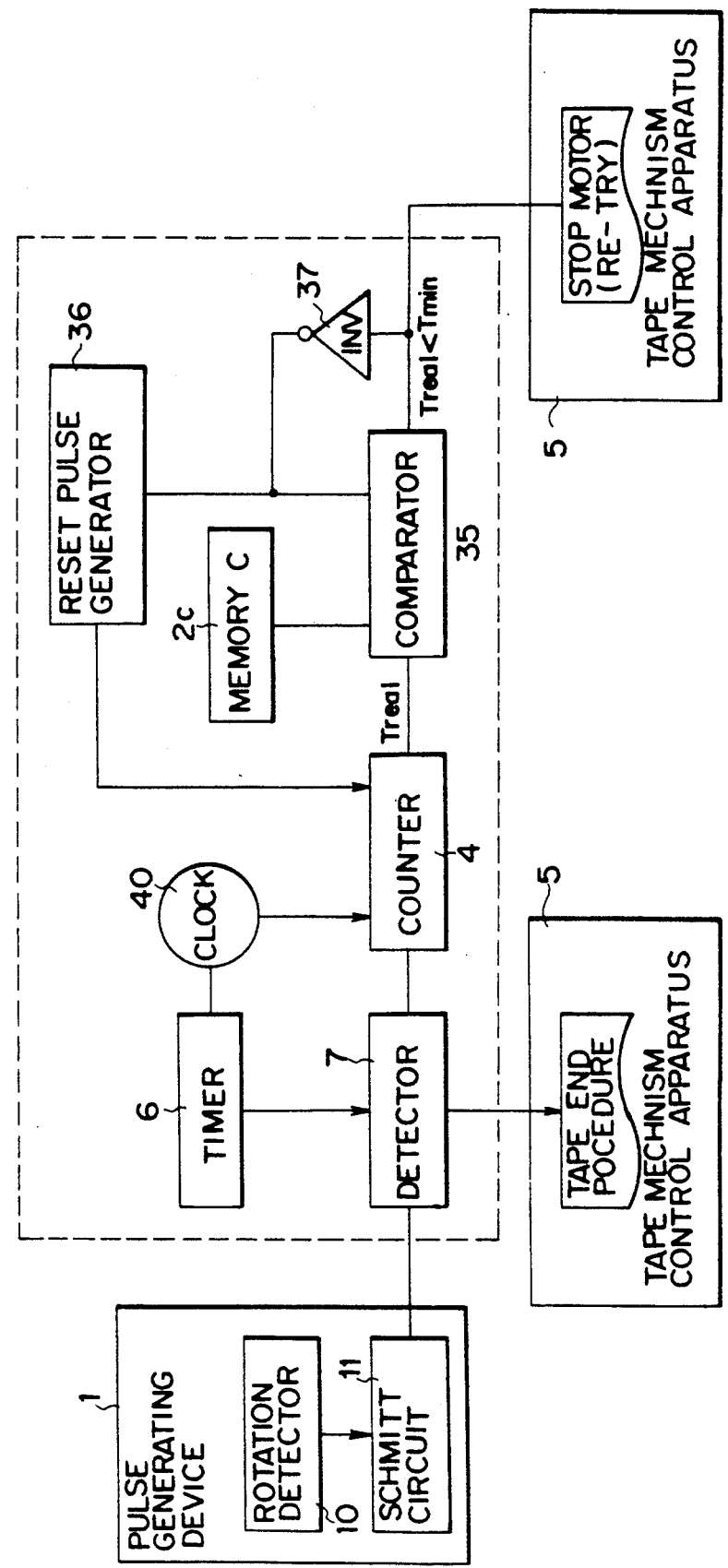
FIG. 4 is a block diagram of a further embodiment of the invention.

FIG. 4 shows an embodiment for detecting an abnormal high-speed rotation of the take-up reel. Similar or equivalent elements as those of FIG. 1 are labeled with the same reference numerals.

The pulse generating device 1 consists of the rotation detector 10 and the Schmitt circuit 11, and its output is entered in the pulse length counter 4 via a detector 7. The pulse length counter 4 receives clocks from the clock 40, continues to count them until the pulse begins to descend, and outputs Treal at that time. A comparator 35 compares Treal with a minimum acceptable pulse length Tmin stored in the pulse length setting memory 2c. When Treal <Tmin is established, the comparator 35 deems the reel rotation to be an abnormal high-speed rotation, and applies a signal to the tape mechanism control apparatus 5 to stop the motor. In case of such an abnormal high-speed rotation, there is a possibility that a normal condition is restored after the motor stops. Therefore, motor stop and re-try operations may be effected in a sequential manner. In case of Tmin <Treal, the comparator 35 deems the reel rotation to be normal, and causes a reset pulse generator 36 to generate a reset pulse to clear the pulse length counter 4. An inverter 37 is used to output a trouble-indicative signal to cause the reset pulse generator 36 to generate a reset pulse.

A timer 6 is used to detect a tape end. That is, a tape end setting time is set here, so that a signal is sent to the detector 7 when the counted number of clocks from the clock 40 reaches the setting time. When no change is found in the pulse until the setting time passes, the detector deems the condition to be a tape end, and applies a signal to the tape mechanism control apparatus 5 to cause it to perform its tape end processing.

Figure 5:
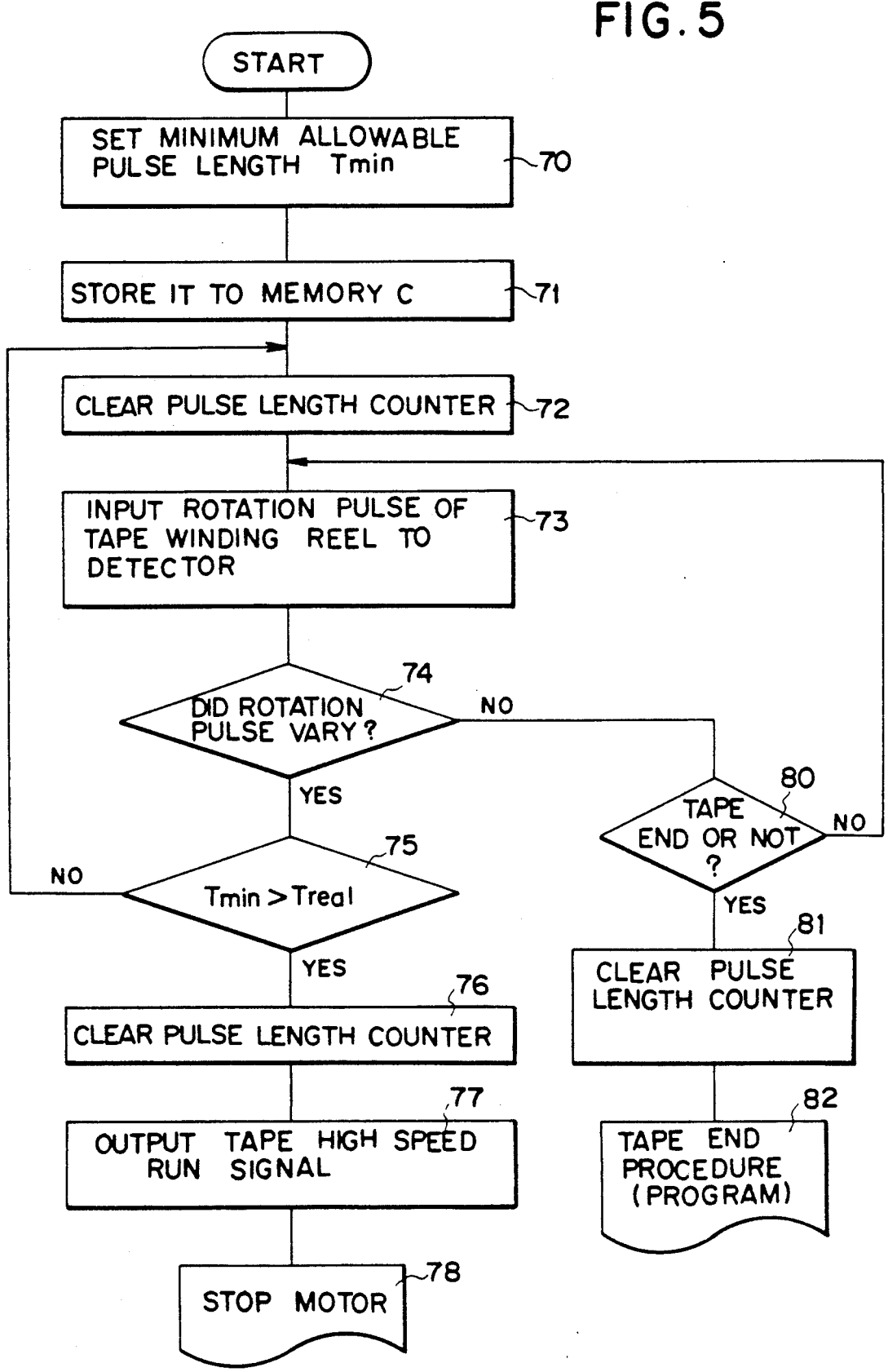
FIG. 5 is a flow chart for explaining the operation process of the apparatus.

Referring to FIG. 5, the operation is explained below. First of all, the minimum acceptable pulse length Tmin is set (step 70), and it is stored in the pulse length setting memory 2c (step 71). Then the pulse length counter 4 is cleared (step 72). A pulse from the pulse generating device 1 is entered, and at the same time, the pulse length counter 4 begins its counting continues it until it is cleared (step 73). Then it is always checked whether any change occurs in the pulse or not (step 74), and if any, comparison of Tmin >Treal is effected (step 75). In case of Tmin >Treal, the reel rotation is deemed to be an abnormal high-speed rotation. Then the counter is cleared (step 76), a signal indicative of the abnormal high-speed rotation is outputted to the tape mechanism control apparatus 5 (step 77), and a motor-stop processing (and re-try processing) is performed (step 78). In case of Tmin <Treal, the reel rotation is deemed to be a normal rotation, and the process is returned to step 72 for entry of a subsequent pulse.

When no pulse change occurs in step 74, the detector 7 checks whether any pulse change occurred or not in the time set in the timer 6 to judge whether the tape has reached an end or not (step 80). If it is not a tape end, the process is returned to step 73. In case of a tape end, the pulse length counter 4 is cleared (step 81), and the tape mechanism control apparatus 5 is activated to perform its tape end processing (step 82).

In this fashion, any abnormal high-speed rotation can be detected.

It is possible to incorporate the abnormal high-speed rotation detecting arrangement into the embodiment of FIG. 1. In this case, the pulse length setting memory 2c shown by a dotted line in FIG. 1 may be provided so that its stored value is entered in the abnormal rotation detecting device 3 for comparison between Tmin and Treal therein. Further, a motor stop (re-try) signal may be outputted to the tape mechanism control apparatus 5.

As explained above, the described arrangement can precisely detect any abnormal rotation of the reel, and this can be outputted to the tape mechanism control apparatus 5 to cure it soon. Therefore, a tape entangling or similar trouble can be prevented. Further, since the above-described embodiment mainly consists of the microcomputer, the entire device, although requiring an increase in the memory capacity, does not require substantial additional elements, and therefore contributes to a cost reduction thereof.

As described above, the inventive tape reel rotation detecting device includes the pulse generating means responsive to rotations of the reel to generate a pulse, the pulse length setting means for setting a pulse length corresponding abnormal rotations of the reel, and the means for comparing the pulse length of a pulse from the pulse generating means with the pulse length stored in the pulse length setting means to detect abnormal rotations of the reel and produce a trouble-indicative signal. Therefore, the inventive apparatus can precisely detect abnormal low-speed rotations or abnormal high-speed rotations of the reel and can output a trouble-indicative signal to prevent troubles caused by such abnormal rotations.

What is claimed is:

1. A device for detecting rotation of a tape reel, comprising:
   pulse generator means for generating a pulse in response to rotation of the reel;
   first pulse length means for defining a first pulse length corresponding to an abnormally low rotation of the reel;
   second pulse length means for defining a second pulse length corresponding to detection of a tape end;
   detection means for detecting an abnormally low rotation of the reel and a tape end by comparing a length of said pulse from said pulse generator means with said first and second pulse lengths defined by said first and second pulse length means, for producing an abnormally low speed signal when said length of said pulse from said pulse generator means is greater than said first pulse length and less than said second pulse length, and for producing a tape end signal when said length of said pulse from said pulse generator means is greater than said second pulse length;
   means responsive to said abnormally low speed signal for performing a tape tight-winding processing; and
   means responsive to said tape end signal for performing a tape end processing.

2. A device according to claim 1, further including third pulse length means for defining a third pulse length corresponding to a minimum acceptable value indicative of an abnormally high speed rotation of said reel, said detection mans detecting abnormally high speed rotation of said reel by comparing said third pulse length defined by said third pulse length means with said length of said pulse from said pulse generating means and by generating an abnormally high speed signal when said length of said pulse from said pulse generator means is less than said third pulse length; and including means responsive to said abnormally high speed signal for stopping movement of a tape wound on the reel.

3. A device according to claim 1, wherein said first pulse length means includes a first memory portion storing a first value representative of said first pulse length, and wherein said second pulse length means includes a second memory portion storing a second value representative of said second pulse length.

4. A device according to claim 3, wherein said detection means includes means for generating a signal which is a train of clock pulses, and includes a processor which counts the number of said clock pulses occurring during said pulse from said pulse generator means, said values in said first and second memory portions each being a count value, said processor effecting comparison of said count of clock pulses to said count value in said first memory portion and said count value in said second memory portion.

5. A device according to claim 4, wherein said processor resets said count of clock pulses in response to production of one of said abnormally low speed signal and said tape end signal.

6. A device for detecting rotation of a tape reel, comprising:
   means for generating a pulse in response to rotation of the reel;
   first pulse length means for defining a first pulse length corresponding to an abnormally high speed rotation of the reel;
   second pulse length means for defining a second pulse length corresponding to detection of a tape end;
   detection means for detecting abnormally high speed rotation of the reel and a tape end by comparing a length of said pulse from said pulse generator means with said first and second pulse lengths defined by said first and second pulse length means, for producing an abnormally high speed signal when said length of said pulse from said pulse generator means is less than said first pulse length, and for producing a tape end signal when said length of said pulse from said pulse generator means is greater than said second pulse length;
   means responsive to said abnormally high speed signal for stopping movement of a tape wound on the reel; and
   means responsive to said tape end signal for performing a tape end processing.

7. A device for monitoring rotation of a tape reel, comprising: pulse generator means responsive to rotation of the reel for producing a pulse having a length which is inversely proportional to a speed of rotation of the reel; detection means for comparing the length of said pulse from said pulse generator means to a predetermined reference length and for producing a signal respectively having first and second states when the length of the pulse is respectively less than and greater than said predetermined reference length, and means for effecting a predetermined action when said signal is in a predetermined one of said first and second states.

8. A device according to claim 7, wherein said detection means includes means for generating a train of clock pulses, and includes counting means for counting the number of said clock pulses which occur during said pulse from said pulse generator means, said predetermined reference length being a count value.

9. A device according to claim 7, wherein said detection means includes means for comparing the length of said pulse from said pulse generator means to a further predetermined reference length and for producing a further signal respectively having first and second states when the length of the pulse is respectively less than and greater than said further predetermined reference length, and further means for effecting a further predetermined action when said further signal is in a predetermined one of said first and second states.

* * * * *